United States Patent
Lechner et al.

(10) Patent No.: US 12,441,066 B2
(45) Date of Patent: Oct. 14, 2025

(54) METHOD AND SYSTEM FOR WELDING THERMOPLASTIC PANELS

(71) Applicant: Rohr, Inc., Chula Vista, CA (US)

(72) Inventors: Robert Lechner, Chula Vista, CA (US); Jonathan S. Huang, Pasadena, CA (US); Michael van Tooren, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 892 days.

(21) Appl. No.: 17/566,265

(22) Filed: Dec. 30, 2021

(65) Prior Publication Data

US 2023/0211565 A1 Jul. 6, 2023

(51) Int. Cl.
  *B29C 65/32* (2006.01)
  *B29C 65/00* (2006.01)
  *B29K 101/12* (2006.01)
  *B29L 31/30* (2006.01)

(52) U.S. Cl.
  CPC ............ *B29C 65/32* (2013.01); *B29C 66/836* (2013.01); *B29K 2101/12* (2013.01); *B29L 2031/3076* (2013.01)

(58) Field of Classification Search
  CPC .......... B29C 66/8362; B29C 66/91221; B29C 66/73921; B29C 66/836; B29K 2101/12; B29K 2307/04
  See application file for complete search history.

(56) References Cited

U.S. PATENT DOCUMENTS

| | | | |
|---|---|---|---|
| 4,440,588 A | | 4/1984 | Stevenson |
| 5,460,317 A | * | 10/1995 | Thomas ............... B29C 65/0681 228/2.1 |
| 2010/0268372 A1 | | 10/2010 | Zurbuchen |
| 2020/0198258 A1 | | 6/2020 | Gallo |
| 2021/0039326 A1 | | 2/2021 | Dichiara |
| 2021/0039327 A1 | | 2/2021 | Dichiara |

(Continued)

FOREIGN PATENT DOCUMENTS

| | | | |
|---|---|---|---|
| CN | 207723742 U | * | 8/2018 |
| CN | 113619125 A | * | 11/2021 |

(Continued)

OTHER PUBLICATIONS

EP Search Report for EP Application No. 22217292.6 dated Jun. 21, 2023.

*Primary Examiner* — Thien S Tran
(74) *Attorney, Agent, or Firm* — Getz Balich LLC

(57) ABSTRACT

A system and method for welding thermoplastic components is provided. The system includes a component positioning system and a welding subsystem. The component positioning system includes a trailing force applicator having first and second lateral side trailing force applicators disposed on opposite lateral sides of a weld line. The welding subsystem is configured to weld the thermoplastic components together at a weld zone. The first and second lateral side trailing force applicators are laterally spaced apart from the weld zone, and at least a portion of the first and second lateral side trailing force applicators are disposed aft of the weld zone. During welding the first and second lateral side trailing force applicators and a welding subsystem probe are moved relative to the thermoplastic components, or vice versa.

16 Claims, 7 Drawing Sheets

(56) References Cited

U.S. PATENT DOCUMENTS

| | | |
|---|---|---|
| 2021/0039329 A1 | 2/2021 | Dichiara |
| 2021/0039332 A1* | 2/2021 | Dichiara |
| 2021/0039334 A1* | 2/2021 | DiChiara ............. B29C 66/301 |
| 2021/0291292 A1* | 9/2021 | Seneviratne ........... B23K 13/02 |

FOREIGN PATENT DOCUMENTS

| | | | |
|---|---|---|---|
| DE | 102014203559 B4 * | 6/2023 | ............ B29C 65/36 |
| JP | 2002263865 A * | 9/2002 | ........... B23K 20/122 |
| WO | 2013110270 A1 | 8/2013 | |

* cited by examiner

METHOD AND SYSTEM FOR WELDING THERMOPLASTIC PANELS

BACKGROUND OF THE INVENTION

1. Technical Field

The present disclosure relates to methods and systems for induction welding thermoplastic components in general, and to methods and systems for locating thermoplastic components during welding in particular.

2. Background Information

Components made from thermoplastic materials are increasingly in demand in the aircraft and other industries as a result of the wide-ranging advantages of the materials. Thermoplastic materials can be used to form lightweight and high-strength structures having complex shapes. In addition, thermoplastic materials, as compared to thermoset materials, offer practically infinite shelf life, faster cycle time, the ability to be recycled/reformed, improved damage tolerance properties, as well as moisture and chemical resistance.

Currently available welding processes include using a single structure to hold the to be welded thermoplastic components together during the welding process. While acceptable, such a device as a means to hold thermoplastic components together is less than ideal. For example, very often a single device that extends across the weld line will obscure the operator's vision of the welding point and inhibit or prevent sensors (e.g., thermal sensors, thermal cameras, etc.) from sensing the welding point. What is needed is an improved method and/or system for holding thermoplastic components together during the welding process, and one that does not obscure sensing the welding process or impede a line of sight inspection technique.

SUMMARY OF THE INVENTION

According to an aspect of the present disclosure, a system for welding thermoplastic components along a weld line is provided. The system includes a component positioning system and a welding subsystem. The component positioning system includes a trailing force applicator having a first lateral side trailing force applicator disposed on a first lateral side of the weld line and a second lateral side trailing force applicator disposed on a second lateral side of the weld line. The welding subsystem is configured to weld the thermoplastic components together at a weld zone. The welding subsystem includes a probe. The first lateral side trailing force applicator and the second lateral side trailing force applicator are laterally spaced apart from the weld zone. At least a portion of the first lateral side trailing force applicator and at least a portion of the second lateral side trailing force applicator are disposed aft of the weld zone. The system is configured so that during welding the first lateral side trailing force applicator, the second lateral side trailing force applicator, and the welding subsystem probe are moved relative to the thermoplastic components, or the thermoplastic components are moved relative to the first lateral side trailing force applicator, the second lateral side trailing force applicator, and the welding subsystem probe.

According to another aspect of the present disclosure, a method for welding thermoplastic components along a weld line is provided. The method includes: a) disposing a first lateral side trailing force applicator disposed on a first lateral side of the weld line and a second lateral side trailing force applicator on a second lateral side of the weld line; the first lateral side trailing force applicator and the second lateral side trailing force applicator are laterally spaced apart from the weld zone, and at least a portion of the first lateral side trailing force applicator and at least a portion of the second lateral side trailing force applicator are disposed aft of a weld zone; b) welding the thermoplastic components together at the weld zone using a welding subsystem having a probe; and c) during welding, moving the first lateral side trailing force applicator, the second lateral side trailing force applicator, and the welding subsystem probe relative to the thermoplastic components, or moving the thermoplastic components relative to the first lateral side trailing force applicator, the second lateral side trailing force applicator, and the welding subsystem probe.

In any of the aspects or embodiments described above and herein, at least one of the first lateral side trailing force applicator or the second lateral side trailing force applicator may include at least one roller configured for contact with the thermoplastic components.

In any of the aspects or embodiments described above and herein, a biasing structure may bias the at least one roller into said contact with the thermoplastic components. The biasing structure may be pneumatically actuated.

In any of the aspects or embodiments described above and herein, at least one of the first lateral side trailing force applicator or the second lateral side trailing force applicator may include a plurality of rollers mounted on a carriage.

In any of the aspects or embodiments described above and herein, at least one of the first lateral side trailing force applicator or the second lateral side trailing force applicator may include a rotatable belt assembly having a belt configured for contact with the thermoplastic components.

In any of the aspects or embodiments described above and herein, at least one of the first lateral side trailing force applicator or the second lateral side trailing force applicator may be disposed aft of the weld zone.

In any of the aspects or embodiments described above and herein, the belt assembly may be configured to contact the thermoplastic components over an engagement distance. The engagement distance may be long enough such that solidification of the weld zone occurs prior to the weld zone traveling aft of the first lateral side trailing force applicator and the second lateral side trailing force applicator.

In any of the aspects or embodiments described above and herein, the rotatable belt assembly may include a forward support wheel, an aft support wheel, and a plurality of intermediary support wheels disposed between the forward support wheel and the aft support wheel. The forward support wheel, the aft support wheel, and the intermediary support wheels may be disposed to contact an interior surface of the belt. The intermediary support wheels may be biased against the interior surface of the belt.

In any of the aspects or embodiments described above and herein, a biasing structure may bias the belt assembly into contact with the thermoplastic components. The biasing structure may be pneumatically actuated.

In any of the aspects or embodiments described above and herein, the component positioning system may further include a leading force applicator having a first lateral side leading force applicator disposed on the first lateral side of the weld line and a second lateral side leading force applicator disposed on the second lateral side of the weld line. The first lateral side leading force applicator and the second lateral side leading force applicator may be laterally spaced apart from the weld zone, and the first lateral side leading force applicator and the second lateral side leading force applicator may be disposed forward of the weld zone.

In any of the aspects or embodiments described above and herein, at least one of the first lateral side leading force applicator or the second lateral side leading force applicator may include at least one roller configured for contact with the thermoplastic components. The at least one of the first lateral side trailing force applicator or the second lateral side trailing force applicator may comprise a plurality of rollers mounted on a carriage.

In any of the aspects or embodiments described above and herein, at least one of the first lateral side leading force applicator or the second lateral side leading force applicator may include a rotatable belt assembly having a belt configured for contact with the thermoplastic components.

In any of the aspects or embodiments described above and herein, the welding subsystem may be an induction welding subsystem.

In any of the aspects or embodiments described above and herein, the thermoplastic plastic components may include a thermoplastic material and electrically conductive elements.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Components made from thermoplastic composite materials are utilized in a variety of different applications, including but not limited to aircraft components. In the manufacture of such components, it is often necessary to join two thermoplastic components together using an induction welding process to form a single component. The need for dimensional accuracy makes it important to properly position the components prior to welding and also to maintain component positioning for a period of time after the welding is performed to ensure no distortion or failure of the weld occurs as the weld zone cools. The present disclosure provides an improved system and method for joining thermoplastic components together.

Figure 1:
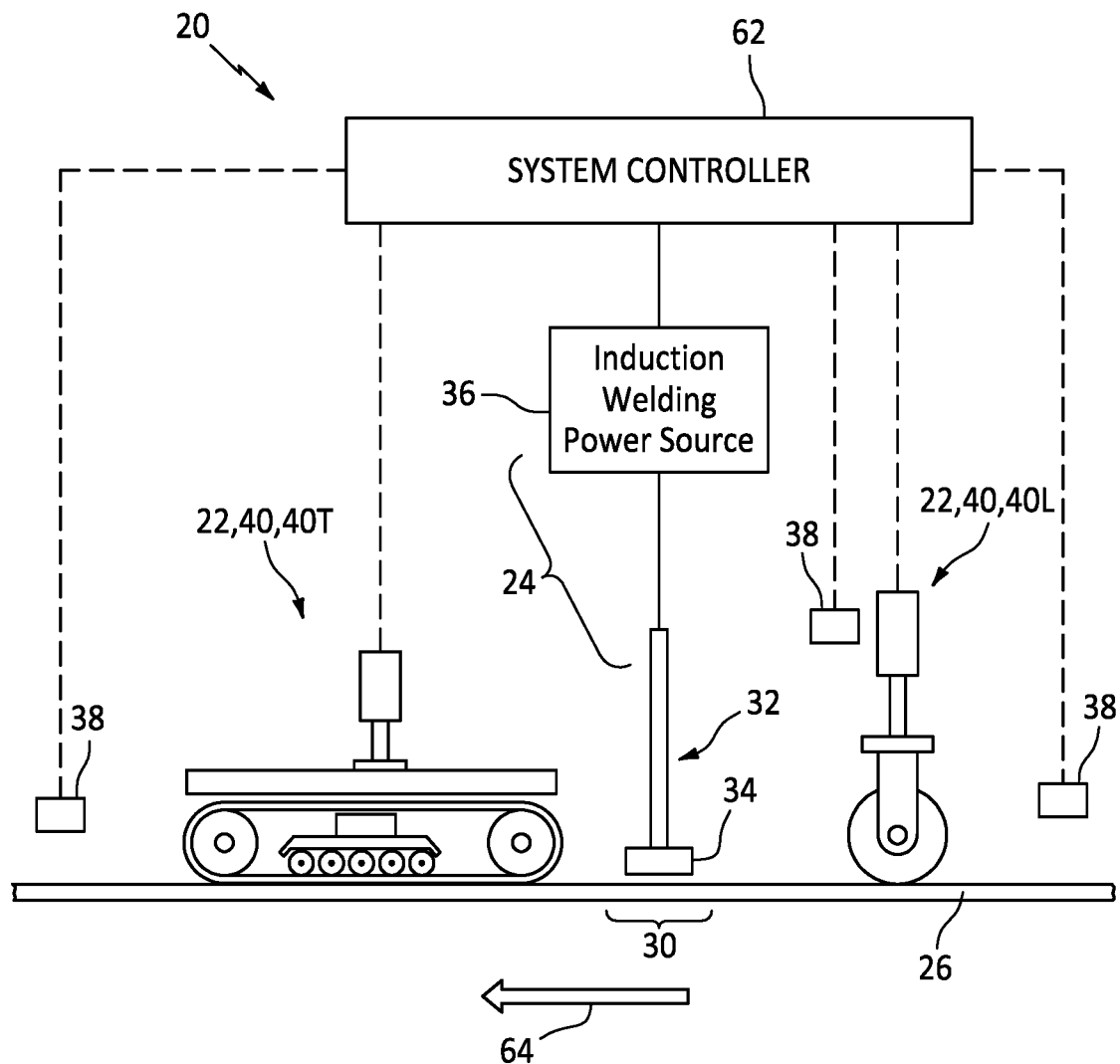
FIG. 1 is a diagrammatic side view of a present disclosure system embodiment.
Figure 2:
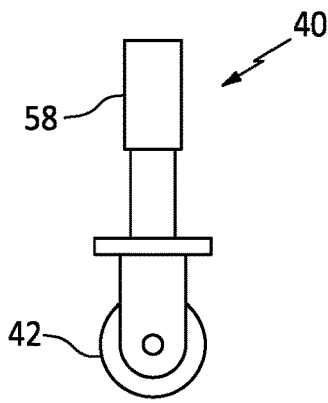
FIG. 2 is a diagrammatic side view of a present disclosure force actuator embodiment.
Figure 3:
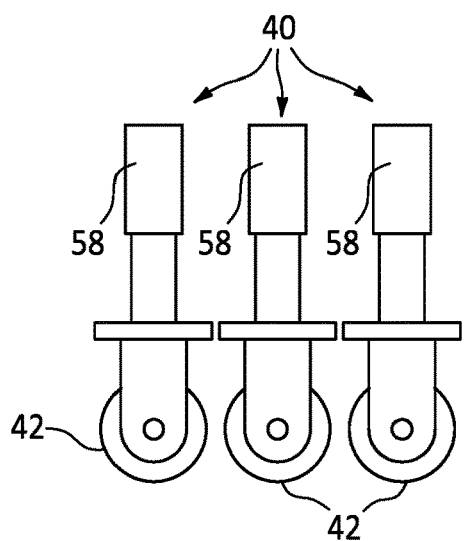
FIG. 3 is a diagrammatic side view of a present disclosure force actuator embodiment.
Figure 4:
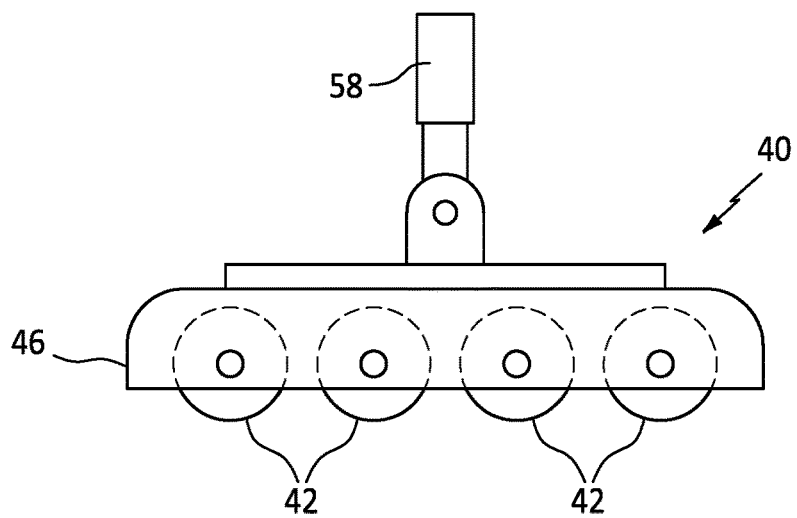
FIG. 4 is a diagrammatic side view of a present disclosure force actuator embodiment.

Referring to FIG. 1, the present disclosure system 20 includes a component positioning subsystem 22 and a thermoplastic component welding subsystem 24. In the thermoplastic component welding process, the thermoplastic components 26 to be joined are either moved and the welding subsystem 24 remains static, or the thermoplastic components 26 to be joined are held static and the system is moved, or some combination thereof. To facilitate such relative movement, in some embodiments, the present disclosure system 20 may include an actuation system (e.g., robotics) operable to move elements of the component positioning subsystem 22 and the induction welding subsystem 24 relative to the thermoplastic components 26 to be joined. The term "weld line" (weld line 28) is used herein to refer to a dynamic line defined by the weld zone 30 as the thermoplastic components 26 are welded and the thermoplastic components 26 and/or the system components are moved relative to one another.

The term "thermoplastic component" as used herein includes components comprised partially or entirely of a thermoplastic material. In some embodiments, electrically conductive elements (e.g., carbon fibers or other electrically conductive fibers, etc.) may be incorporated into the thermoplastic material. As indicated above, thermoplastic components 26 may be used in a wide variety of different applications that dictate different mechanical strength requirements, rigidity or flexibility requirements, thermal environment requirements, or the like, or any combination thereof. Hence, the material comprising the thermoplastic component is chosen to satisfy those requirements. Components used to produce aircraft structures (e.g., fuselage, nacelle, etc.) are a non-limiting example of a thermoplastic component. Non-limiting examples of a thermoplastic material that may be welded according to the present disclosure include low melt (LM) polyaryletherketone ("PAEK") and polyether ether ketone ("PEEK"). The present disclosure method may be utilized with a variety of different thermoplastic materials and is therefore not limited to any particular thermoplastic material.

In some embodiments, the thermoplastic component welding subsystem 24 may include an induction welding probe 32 having a head 34 disposed at a distal end. The head 34 includes one or more induction coils that may be selectively energized with a radio-frequency electric current produced from a power source 36. The radio-frequency electric current passing through the induction coil(s) produces a high-frequency electromagnetic field. The electromagnetic field(s) produced by the induction coil(s) act on electrically conductive elements (e.g., carbon fibers or other electrically conductive fibers, etc.) that may be disposed within the thermoplastic components 26 to be joined to produce magnetically induced currents ("eddy currents") within the electrically conductive elements. Electrical resistance produced within the electrically conductive elements as a result of the induced currents produces resistive heating utilized in the component 26 joining process (i.e., the "welding process").

The induction welding probe 32 (and the radio-frequency electric current power source 36) may be controlled to produce the desired electromagnetic field(s) and related degree of resistive heating for the component welding process. Component characteristics such as the particular type of thermoplastic material, the thickness of the components to be welded, and the like often dictate welding parameters such as the amount of resistive heat required to weld the thermoplastic components 26, the depth of the melt zone, etc. Controlling the induction welding process in a desired manner is not, however, always an easy task and the need to repeatably produce an acceptable weld is important. Embodiments of the present disclosure may include one or more sensors 38 operable to sense the weld zone 30 to monitor the welding process. Non-limiting examples of such sensors 38 include temperature sensors that operate by being in close proximity to the weld zone 30, or temperature sensors that optically sense the weld zone 30 but require line-of-sight access to the weld zone 30 (e.g., thermal cameras, etc.). As will be described below, the present disclosure embodiments permit advantageous sensor access to the component weld zone 30.

Referring to FIGS. 2-7, embodiments of the component positioning subsystem 22 includes a plurality of force applicators 40 configured to apply a force to a surface of the thermoplastic components 26 to be joined. The force applicators 40 operate to position the thermoplastic components 26 during the welding process to facilitate achieving the desired weld. One or more of the force applicators 40 may be disposed at a "trailing" position (e.g., see FIG. 1). These force applicators may be referred to as "trailing force applicators 40T". The term "trailing" as used herein refers to a position aft of the position where welding occurs; i.e., the welded portion of the thermoplastic components 26 travels aft of the welding position after being welded. One or more of the force applicators 40 may be disposed at a "leading" position (e.g., see FIG. 1). These force applicators 40 may be referred to as "leading force applicators 40L". The term "leading" as used herein refers to a position in front of where welding occurs; i.e., the thermoplastic components 26 to be joined will encounter a leading force applicator 40L prior to being welded, prior to the weld position. Thermoplastic components 26 may be welded along a straight linear line or may be welded along a line that is other than a straight linear line, or any combination thereof.

Force applicator 40 embodiments may include at least one roller 42 having a rotational axis 44 that is perpendicular to the weld direction. The roller 42 is in direct or indirect contact with the thermoplastic component workpieces 26 and rotates as the workpieces 26 move relative to the welding subsystem 24. In some embodiments, a force applicator 40 may have a single roller 42 (e.g., see FIG. 2). In some embodiments, a plurality of independent force applicators 40 each having a single roller 42 (e.g., see FIG. 3) may be used. In some embodiments, a force applicator 40 may have a plurality of rollers 42 acting in concert (e.g., see FIG. 4). In those embodiments where a force applicator 40 has a plurality of rollers 42 acting in concert, the plurality of rollers 42 may be mounted to a carriage structure 46 allowing the plurality of rollers 42 to collectively act as a single structure.

Figure 5:
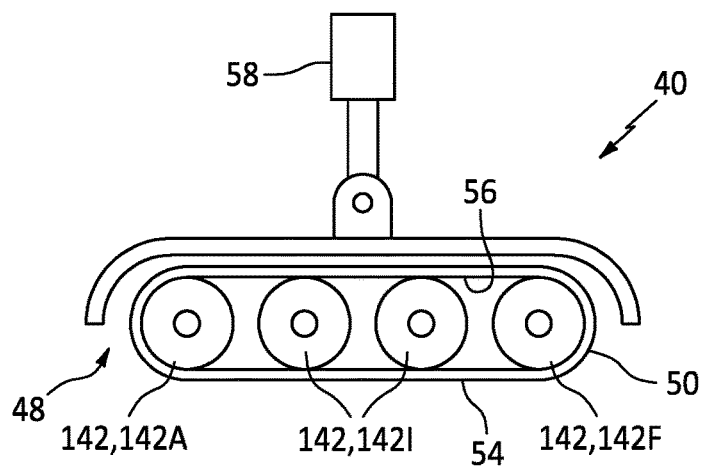
FIG. 5 is a diagrammatic side view of a present disclosure force actuator embodiment.
Figure 6:
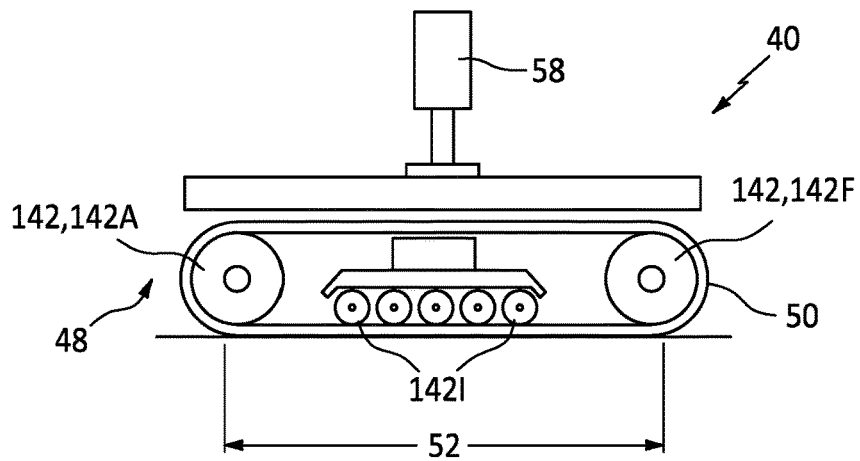
FIG. 6 is a diagrammatic side view of a present disclosure force actuator embodiment.

In some embodiments, a force applicator 40 may have a rotating belt assembly 48 with a belt 50 that rotates around a plurality of support rollers 142 (e.g., see FIGS. 5 and 6). The belt 50 and the support rollers 142 have a rotational axis 44 that is perpendicular to the weld direction. The belt 50 may be configured to contact a thermoplastic component workpiece over an engagement distance 52. The belt 50 has an exterior surface 54 and an interior surface 56. The rotatable belt 50 extends between and wraps around a forward support roller 142F and an aft support roller 142A separated from one another. Some belt assembly 48 embodiments may include one or more additional support rollers ("intermediary support rollers 1421") disposed between the forward and aft support rollers 142F, 142A. The support rollers 142F, 142A, 1421 may be in contact with the interior surface 56 of the rotatable belt 50. The exterior surface 54 of the rotatable belt 50 may be applied directly to the surfaces of the thermoplastic component workpieces 26. Examples of a belt assembly 48 having forward and aft support rollers 142F, 142A and one or more intermediary support rollers 1421 is shown in FIGS. 5 and 6. In the embodiment shown in FIG. 6, a plurality of intermediary support rollers 1421 are attached to a carriage for mounting the intermediary support rollers 1421 in concert. The intermediary support rollers 1421 help to increase the uniformity of the force applied against the thermoplastic component workpieces 26 along the length of the belt assembly 48.

The force applicator 40 embodiments shown in FIGS. 2-6 represent non-limiting examples of force applicator 40 configurations. In some component positioning subsystems 22, combinations of different force applicator 40 configurations may be used.

In some embodiments, a force applicator 40 may include a biasing structure 58 (e.g., one or more springs, pneumatic cylinders, hydraulic cylinders, a weight, etc.) operable to force the roller(s) 42 or a belt assembly 48 in a direction toward (and in some embodiments against) a thermoplastic component workpiece 26. The force applied by the biasing structure 58 may increase the uniformity of the force applied to the workpiece by the force applicator 40. As shown in FIG. 6, some belt assembly 48 embodiments may include a biasing structure 58 operable to bias intermediary support rollers 1421 against the interior surface 56 of the belt 50; e.g., to increase the uniformity of the force applied by the belt 50 against the thermoplastic component workpieces 26 along the engagement distance 52 of the belt 50 (see FIG. 6).

Figure 7:
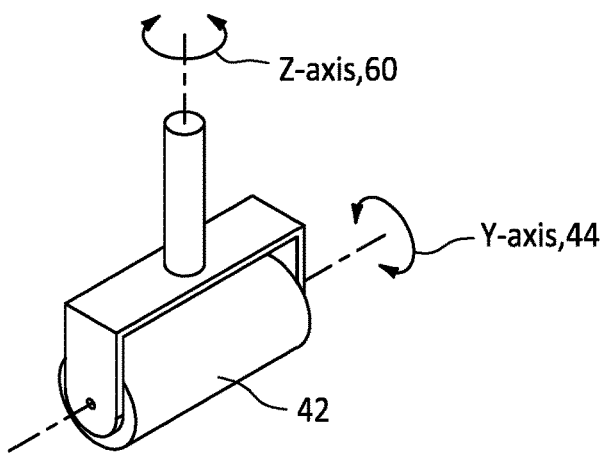
FIG. 7 is a diagrammatic view of a roller mounted for rotation along two orthogonal axes.

Referring to FIG. 7, in some embodiments a force applicator 40 may be mounted in a manner that permits a second axis of rotation. As described above, force applicator rollers 42 (or belts 50) are configured to rotate about a first axis 44 that is perpendicular to the weld direction. In these embodiments, a force applicator 40 is mounted in a manner that permits a second axis 60 of rotation orthogonal to the first axis 44. For example, if the weld direction extends along an X-axis and the first rotational axis 44 of the roller 42 extends along a Y-axis, then the second rotational axis 60 of the roller 42 may extend along a Z-axis, where X, Y, and Z are orthogonal axes. In this manner, the roller 42 (or belt 50) is mounted to pivot about an axis (e.g., the Z-axis) to help maintain rotational axis alignment of the roller 42 (or belt 50) perpendicular to the weld direction; e.g., as may be beneficial for weld lines 28 that are not straight.

In present disclosure system 20 embodiments that utilize inductive heating, components of the force applicators 40 may be made of electrically non-conductive material to avoid any collateral inductive heating that may occur in the proximity of an induction welding probe 32.

Referring to FIGS. 8A-11C, some embodiments of the component positioning subsystem 22 include a first lateral side trailing force applicator 140A and a second lateral side trailing force applicator 140B. Both the first and second lateral side trailing force applicators 140A, 140B may be disposed on the same side of the thermoplastic component workpieces 26 to be welded (e.g., on the top) and they are laterally separated from one another a distance so as to be on opposite lateral sides of the weld zone 30; i.e., the first lateral side trailing force applicator 140A is disposed on a first lateral side of the weld zone 30 and the second lateral side trailing force applicator 140B is disposed on a second lateral side of the weld zone 30, opposite the first lateral side. Hence, the weld zone 30 is exposed between the first and second lateral side trailing force applicators 140A, 140B. As indicated above, embodiments of the present disclosure may include one or more sensors 38 operable to sense the weld zone 30 to monitor the welding process. The lateral separation between the first and second lateral side trailing force applicators 140A, 140B facilitates sensing of the weld zone 30; e.g., permits line-of-sight sensing.

Figure 8A:
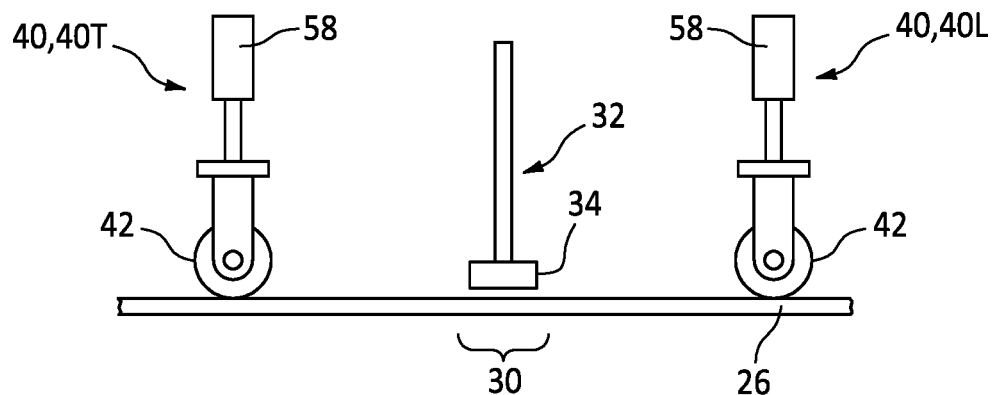
FIG. 8A is a diagrammatic side view of the present disclosure system embodiment.
Figure 8B:
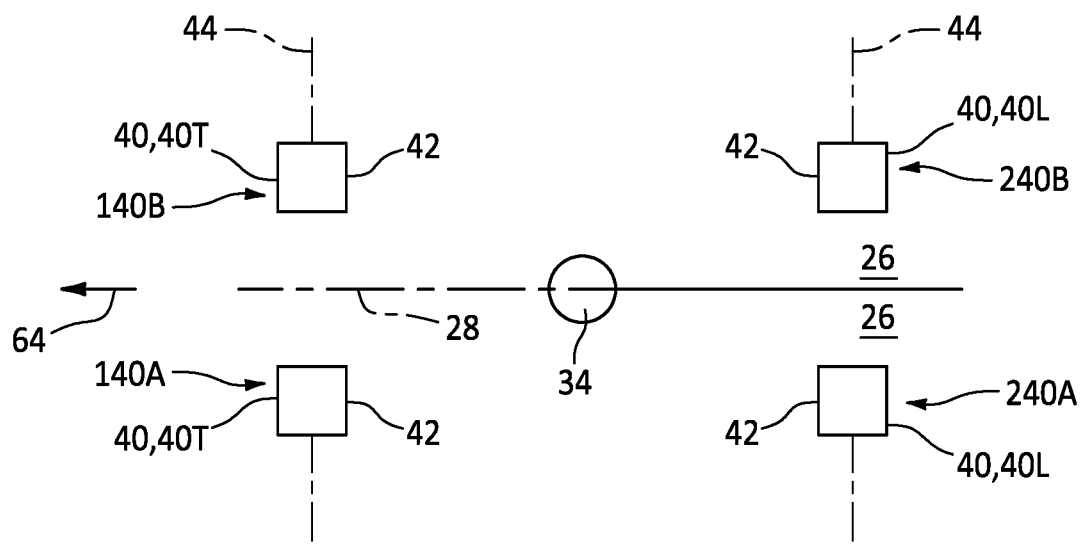
FIG. 8B is a diagrammatic top view of the present disclosure system embodiment shown in FIG. 8A.
Figure 9A:
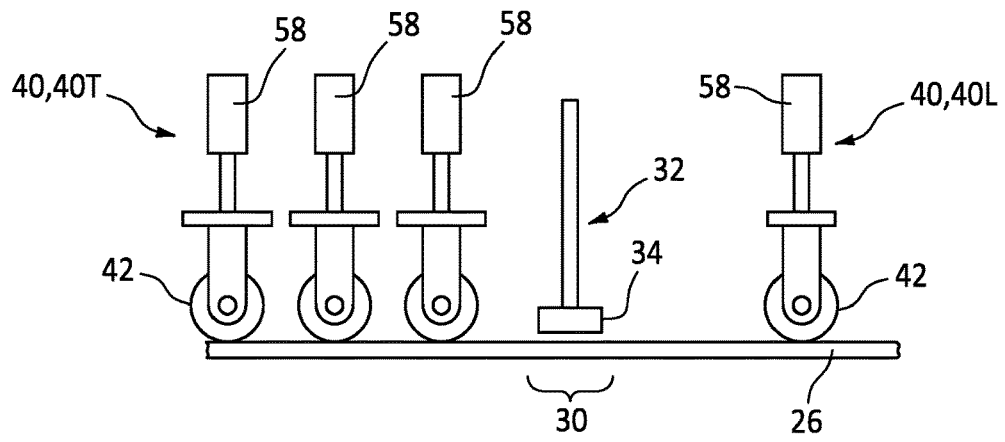
FIG. 9A is a diagrammatic side view of the present disclosure system embodiment.
Figure 9B:
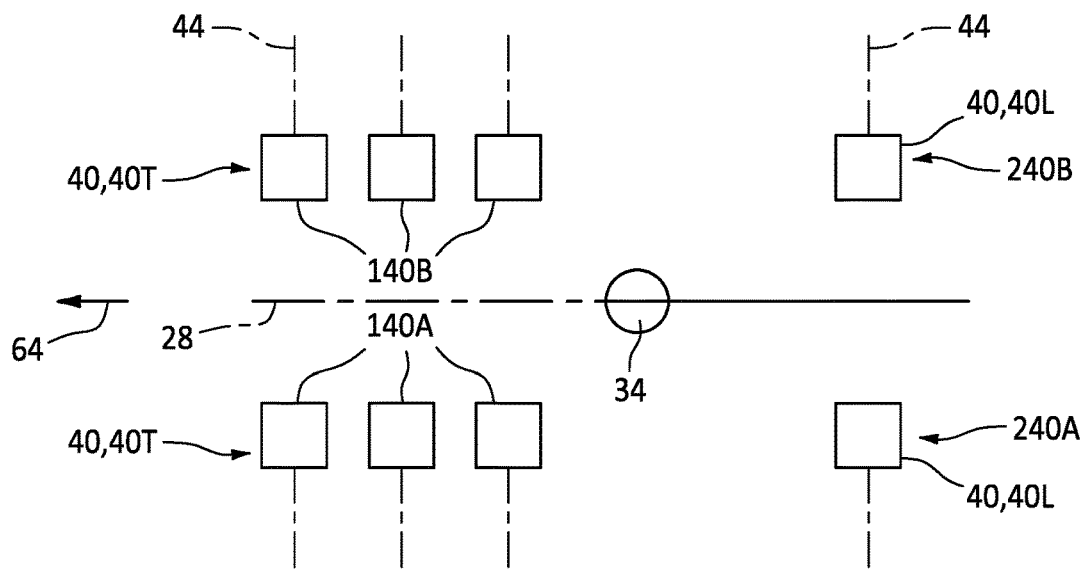
FIG. 9B is a diagrammatic top view of the present disclosure system embodiment shown in FIG. 9A.
Figure 9C:
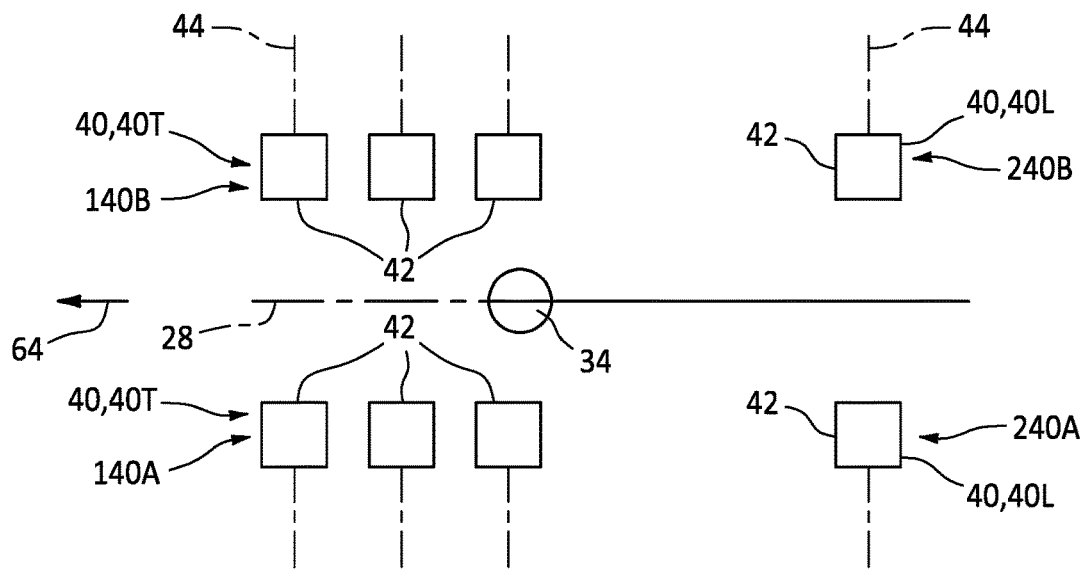
FIG. 9C is a diagrammatic top view of the present disclosure system embodiment shown in FIG. 9A with an alternative induction heating probe position.
Figure 10A:
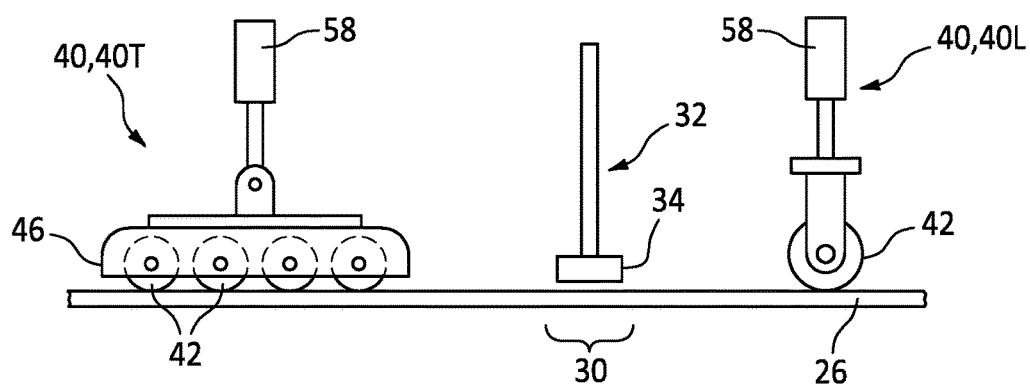
FIG. 10A is a diagrammatic side view of the present disclosure system embodiment.
Figure 10B:
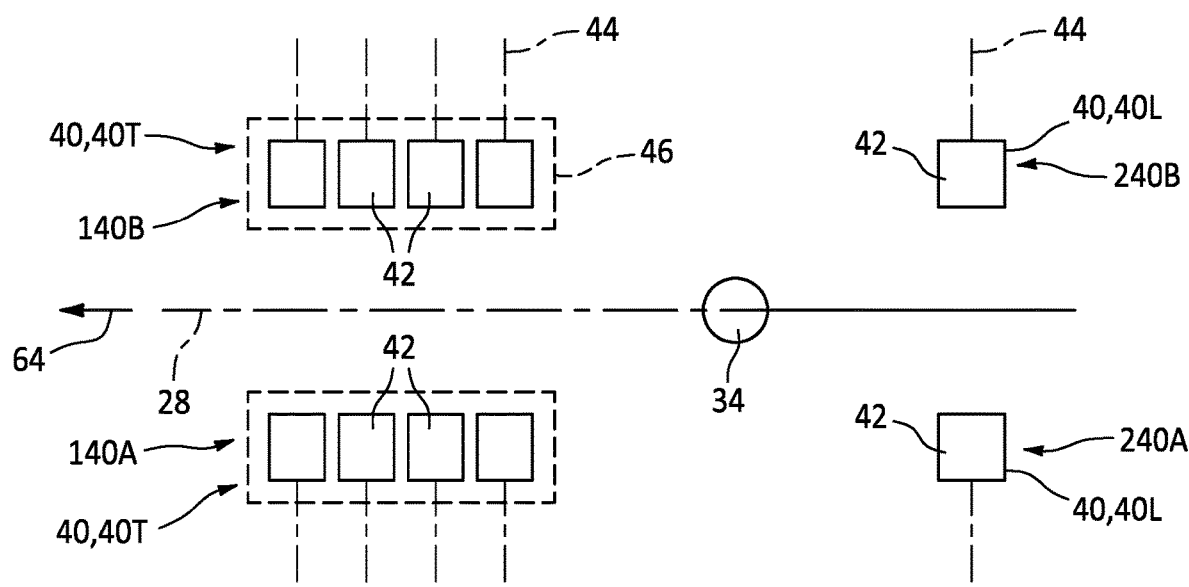
FIG. 10B is a diagrammatic top view of the present disclosure system embodiment shown in FIG. 10A.
Figure 11A:
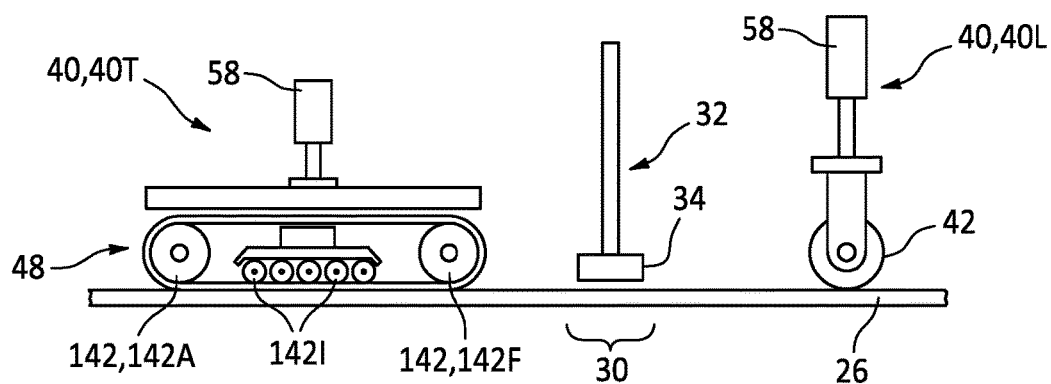
FIG. 11A is a diagrammatic side view of the present disclosure system embodiment.
Figure 11B:
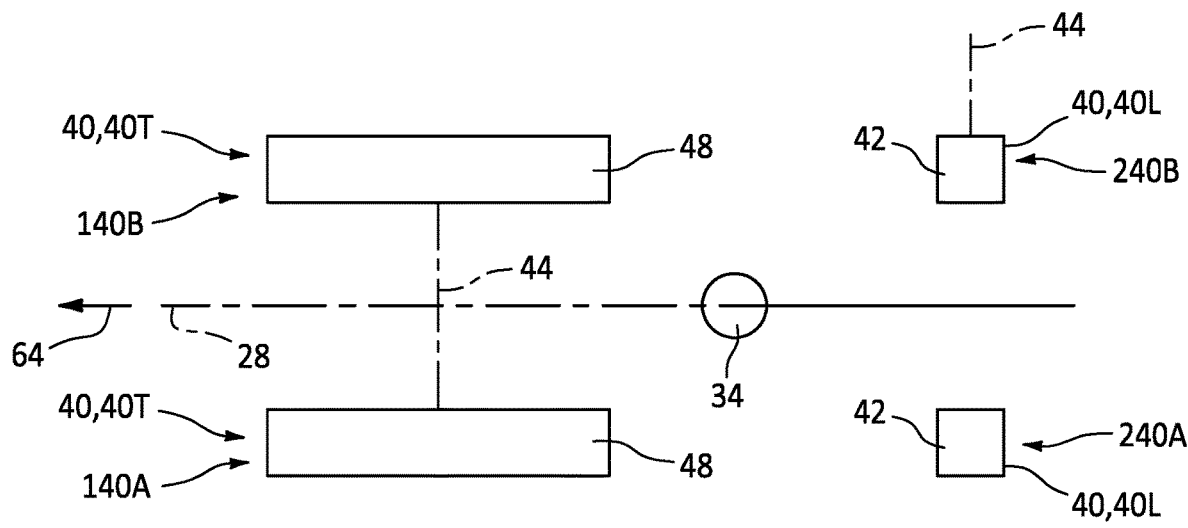
FIG. 11B is a diagrammatic top view of the present disclosure system embodiment shown in FIG. 11A.
Figure 11C:
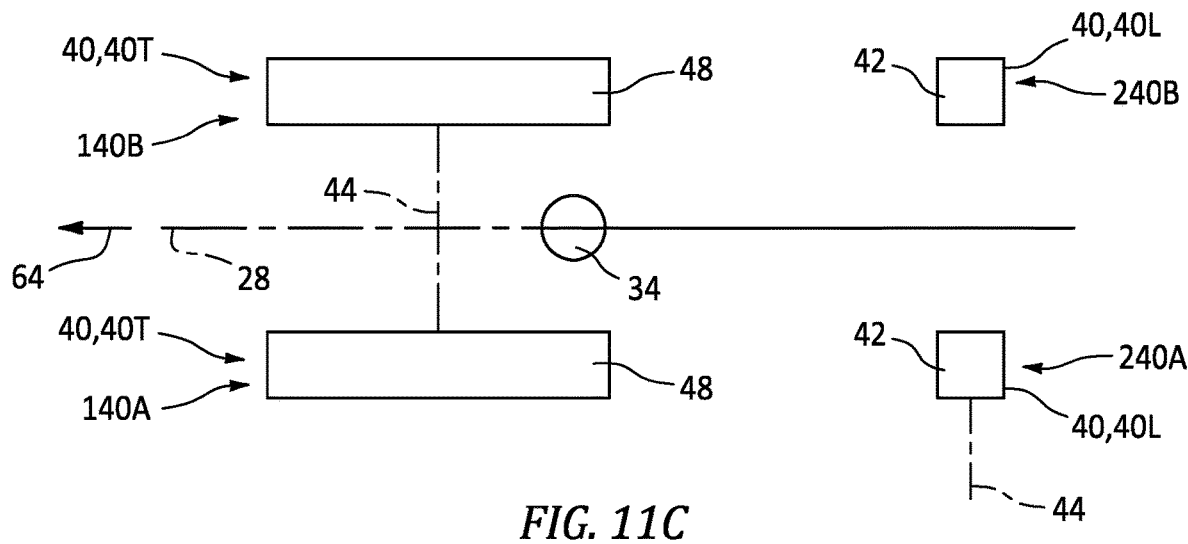
FIG. 11C is a diagrammatic top view of the present disclosure system embodiment shown in FIG. 11A with an alternative induction heating probe position.

As indicated above, a force applicator 40 (in this case the first and second trailing force applicators 140A, 140B) may be configured in a variety of different configurations. FIGS. 8A and 8B illustrate an embodiment wherein the first and second trailing force applicators 140a, 140B each include a single roller 42. FIGS. 9A-9C illustrate an embodiment that includes a plurality of independent first lateral side trailing force applicators 140A each having a single roller 42, and a plurality of independent second lateral side trailing force applicators 140B each having a single roller 42. FIGS. 10A and 10B illustrate an embodiment that includes a first lateral side trailing force applicator 140A having a plurality of rollers 42 acting in concert, and a second lateral side trailing force applicator 140B having a plurality of rollers 42 acting in concert. FIGS. 11A-11C illustrate an embodiment that includes a first lateral side trailing force applicator 140A having a belt assembly 48, and a second lateral side trailing force applicator 140B having a belt assembly 48. As indicated herein, the above described trailing force applicator configurations 140A, 140B are non-limiting examples. In the examples shown in FIGS. 8A-11C, the first and second lateral side trailing force applicators 140A, 140B are shown with the same configuration on both lateral sides; e.g., both the first and second lateral side trailing force applicators 140A, 140B have single rollers 42, or both have a belt assembly 48, etc. The present disclosure is not limited to having first and second lateral side trailing force applicators 140A, 140B that mirror one another. For example, embodiments of the component positioning subsystem 22 may include a first lateral side trailing force applicator 140A configured as a belt assembly 48 and include a plurality of second lateral side trailing force applicators 140B; e.g., a plurality of single roller 42 force applicators 40. In addition, more than one type of force applicator 40 (e.g., a single roller 42, or rollers 42 acting in concert, or a belt assembly 48, etc.) may be disposed on a lateral side, and the types of the force applicators 40 (e.g., a single roller 42, or rollers 42 acting in concert, or a belt assembly 48, etc.) disposed on one lateral side may be different from the types of force applicators 40 disposed on the opposite lateral side.

As indicated above, in some embodiments both the first and second lateral side trailing force applicators 140A, 140B may be disposed aft of the position where welding occurs. The embodiments shown in FIGS. 8B, 9B, 10B, and 11B illustrate the first and second lateral side trailing force applicators 140A, 140B disposed aft of the induction welding probe 32. Hence, during the welding process the first and second lateral side trailing force applicators 140A, 140B "trail" the weld zone 30; i.e., the newly welded region of the workpieces 26 reaches the first and second lateral side trailing force applicators 140A, 140B subsequent to being welded. In some embodiments a portion of the trailing force applicators 140A, 140B may be disposed adjacent the welding position and a portion of the trailing force applicators 140A, 140B may be disposed aft of the position where welding occurs. The embodiment shown in FIG. 9C illustrates an embodiment wherein each of the first and second lateral side trailing force applicators 140A, 140B includes a plurality of independent single roller 42 force applicators 40 and the induction welding probe 32 is disposed between (and therefore adjacent) a forward pair of the independent single roller 42 force applicators 40, and the remaining independent single roller 42 force applicators 40 are disposed aft of the position where welding occurs. In similar fashion, FIG. 11C illustrates the induction welding probe 32 disposed between (and therefore adjacent) a forward portion of the belt assemblies 48 of the first and second lateral side trailing force applicators 140A, 140B and aft portions of the belt assemblies 48 of the first and second lateral side trailing force applicators 140A, 140B trail behind the weld zone 30.

Embodiments of the component positioning subsystem 22 may include one or more leading force applicators 40 disposed forward (or "leading") the weld zone 30. The force applicator 40 configurations described above are applicable to both the leading and trailing force applicators 40, and the leading force applicators 40 may be the same as or different from the trailing force applicators. FIGS. 8A-11C illustrate embodiments of the component positioning subsystem 22 that include a first lateral side leading force applicator 240A and a second lateral side leading force applicator 240B both disposed forward (or "leading") the weld zone 30. Both the first and second lateral side leading force applicators 240A, 240B may be disposed on the same side of the thermoplastic component workpieces 26 to be welded (e.g., on the top) and they are laterally separated from one another a distance so as to be on opposite lateral sides of the weld zone 30; i.e., the first lateral side leading force applicator 240A is disposed on a first lateral side of the weld zone 30 and the second lateral side leading force applicator 240B is disposed on a second lateral side of the weld zone 30, opposite the first lateral side. Hence, the weld zone 30 is exposed between the first and second lateral side leading force applicators 240A, 240B. In the embodiments shown in FIGS. 8A-11C, the leading force applicators 240A, 240B and the trailing force applicators 140A, 140B are disposed on the same side of the workpieces 26; e.g., on the top. In some embodiments, leading force applicators 240A, 240B and trailing force applicators 140A, 140B may be disposed on opposite sides of the workpieces 26; e.g., leading force applicators 140A, 140B disposed on the bottom side of the workpieces 26 and trailing force applicators 240A, 240B disposed on the top side of the workpieces 26.

In some embodiments, force applicators 40 may be disposed both above and below the workpieces 26 in the trailing position or the leading position or both.

As indicated above, in the welding process thermoplastic component workpieces 26 to be joined are either moved in a weld direction and the welding subsystem 24 remains static, or the workpieces 26 to be joined are held static relative to the weld direction and the system is moved, or some combination thereof. In a present disclosure system embodiment wherein the component positioning subsystem 22 and the thermoplastic component welding subsystem 24 are moved in the weld direction, the present disclosure system 20 may include an actuation system (e.g., robotics) operable to move elements of the component positioning subsystem 22 and the thermoplastic component welding subsystem relative to the thermoplastic component workpieces 26. For example, elements of the component positioning subsystem 22 and the thermoplastic component welding subsystem may be mounted on a robotic actuator controlled to apply the same to the workpieces 26. The robotic actuator may be used to apply biasing force against one or more of the force applicators.

In some embodiments, the present disclosure may include a system controller 62 in communication with system components (e.g., the welding subsystem 24, fluid powered force applicator biasing systems, actuation systems such as robotic actuators, weld zone sensors 38, etc.) and the like to control and or receive signals therefrom to perform the functions described herein. The system controller 62 may include any type of computing device, computational circuit, processor(s), CPU, computer, or the like capable of executing a series of instructions that are stored in memory. The system controller 62 may be configured as hardware or software or any combination thereof. The instructions may include an operating system, and/or executable software modules such as program files, system data, buffers, drivers, utilities, and the like. The executable instructions may apply to any functionality described herein to enable the system 20 to accomplish the same algorithmically and/or coordination of system components. The system controller 62 may include a single memory device or a plurality of memory devices and the present disclosure is not limited to any particular type of memory device. The system controller 62 may include, or may be in communication with, an input device that enables an operator to enter data and/or instructions, and may include, or be in communication with, an output device configured, for example to display information (e.g., a visual display or a printer), or to transfer data, etc. Communications between the system controller 62 and other system components may be via a hardwire connection or via a wireless connection.

Referring to FIGS. 11A-11C, an example of how an embodiment of the present disclosure system 20 may be utilized is provided. FIG. 11A illustrates a side view of a pair of thermoplastic component workpieces 26 that are to be joined together. In this example, the workpieces 26 are moved relative to the elements of the component positioning subsystem 22 and the thermoplastic component welding subsystem 24 in the direction shown by arrow 64. An induction welding probe 32 is shown disposed between leading force applicators 240A, 240B and a trailing force applicators 140A, 140B. A weld zone 30 is disposed at the junction of the thermoplastic workpieces 26. As the workpieces 26 traverse through the system 20, the weld zone 30 is created at the induction welding probe 32 and continues in the weld direction (forward to aft) for a distance until the thermoplastic materials solidify. Depending on various factors, the weld zone 30 may continue for a distance and be disposed at least partially between the lateral side trailing force actuators 140A, 140B. FIGS. 11A and 11B illustrate a plurality of sensors 38 positioned to sense parameters within the weld zone 30 and beyond, some of which are positioned to sense along a line-of-sight. FIG. 11C illustrates an embodiment wherein the induction welding probe 32 is disposed between some (or a portion of) lateral side trailing force applicators 140A, 140B. In some applications, it may be beneficial to position the induction welding probe 32 in this manner. It should be noted that in this alternative induction welding probe 32 embodiment, using the present disclosure it is still possible to sense the weld zone 30 using line-of-sight sensors 38. The present disclosure is, therefore, not limited to disposing the induction welding probe 32 forward of the trailing force applicators 140A, 140B.

The respective leading and trailing force applicators 240A, 240B, 140A, 140B facilitate positioning of the thermoplastic components 26 to be joined as the components traverse through the system 20. In those system 20 embodiments that utilize trailing force applicators 140A, 140B configured as belt assemblies 48, the engagement distance 52 of the belt assemblies 48 (see FIG. 6) may be chosen to be long enough to ensure thermoplastic solidification prior to exiting the belt assemblies 48.

The present disclosure system is described above as having, but not limited to a thermoplastic component welding subsystem 24 utilizing induction welding. In some embodiments, the thermoplastic component welding subsystem 24 may use an alternative welding process such as ultrasonic welding or the like. In addition, the present disclosure is described above in terms of welding a thermoplastic material that includes electrically conductive elements such as carbon fibers or the like. In some embodiments, thermoplastic components 26 that do not include electrically conductive elements may be inductively welded using an electrically conductive body (sometimes referred to as a "susceptor") placed in contact with the thermoplastic components 26 over the area to be welded. In these embodiments, the induction welding probe 32 may be used to heat the susceptor, and the susceptor in turn heats the regions of the thermoplastic components 26 to be welded to the appropriate temperature for joinder. Hence, in these embodiments the thermoplastic components 26 need not include electrically conductive elements.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A system for welding thermoplastic components along a weld line, comprising:
   a component positioning system that includes a trailing force applicator having a first lateral side trailing force applicator disposed on a first lateral side of the weld line and a second lateral side trailing force applicator disposed on a second lateral side of the weld line; and
   a welding subsystem configured to weld the thermoplastic components together at a weld zone, the welding subsystem having a probe;
   wherein the first lateral side trailing force applicator and the second lateral side trailing force applicator are laterally spaced apart from the weld zone, each of the first lateral side trailing force applicator and the second lateral side trailing force applicator including a biasing structure; and
   wherein the first lateral side trailing force applicator and the second lateral side trailing force applicator are disposed aft of the weld zone; and
   wherein the system is configured so that the first lateral side trailing force applicator, the second lateral side trailing force applicator, and the welding subsystem probe are moved relative to the thermoplastic components during welding, or the thermoplastic components are moved relative to the first lateral side trailing force applicator, the second lateral side trailing force applicator, and the welding subsystem probe,
   wherein at least one of the first lateral side trailing force applicator or the second lateral side trailing force applicator comprises a rotatable belt assembly having a belt configured for contact with the thermoplastic components, and the biasing structure biases the belt assembly into said contact with the thermoplastic components.

2. The system of claim 1, wherein at least one of the first lateral side trailing force applicator or the second lateral side trailing force applicator comprises at least one roller configured for contact with the thermoplastic components.

3. The system of claim 2, wherein the biasing structure biases the at least one roller into said contact with the thermoplastic components.

4. The system of claim 3, wherein the biasing structure is pneumatically actuated.

5. The system of claim 2, wherein the at least one of the first lateral side trailing force applicator or the second lateral side trailing force applicator comprises a plurality of rollers mounted on a carriage.

6. The system of claim 1, wherein the belt assembly is configured to contact the thermoplastic components over an engagement distance.

7. The system of claim 6, wherein the engagement distance is long enough such that thermoplastic solidification of the weld zone occurs prior to the weld zone traveling aft of the first lateral side trailing force applicator and the second lateral side trailing force applicator.

8. The system of claim 6, wherein the rotatable belt assembly includes a forward support wheel, an aft support wheel, and a plurality of intermediary support wheels disposed between the forward support wheel and the aft support wheel, wherein the forward support wheel, the aft support wheel, and the intermediary support wheels are disposed to contact an interior surface of the belt.

9. The system of claim 8, wherein the intermediary support wheels are biased against the interior surface of the belt.

10. The system of claim 1, wherein the component positioning system further includes a leading force applicator having a first lateral side leading force applicator disposed on the first lateral side of the weld line and a second lateral side leading force applicator disposed on the second lateral side of the weld line, and the first lateral side leading force applicator and the second lateral side leading force applicator are laterally spaced apart from the weld zone, and the first lateral side leading force applicator and the second lateral side leading force applicator are disposed forward of the weld zone.

11. The system of claim 10, wherein at least one of the first lateral side leading force applicator or the second lateral side leading force applicator comprises at least one roller configured for contact with the thermoplastic components.

12. The system of claim 11, wherein the at least one of the first lateral side trailing force applicator or the second lateral side trailing force applicator comprises a plurality of rollers mounted on a carriage.

13. The system of claim 10, wherein at least one of the first lateral side leading force applicator or the second lateral side leading force applicator comprises a rotatable belt assembly having a belt configured for contact with the thermoplastic components.

14. The system of claim 1, wherein the welding subsystem is an induction welding system.

15. The system of claim 14, wherein the thermoplastic plastic components comprise a thermoplastic material and electrically conductive elements.

16. A method for welding thermoplastic components along a weld line, comprising:
　　disposing a first lateral side trailing force applicator disposed on a first lateral side of the weld line and a second lateral side trailing force applicator on a second lateral side of the weld line, wherein the first lateral side trailing force applicator and the second lateral side trailing force applicator are laterally spaced apart from a weld zone, and wherein the first lateral side trailing force applicator and the second lateral side trailing force applicator are disposed aft of the weld zone, and wherein at least one of the first lateral side trailing force applicator or the second lateral side trailing force applicator comprises a rotatable belt assembly having a belt configured for contact with the thermoplastic components; and welding the thermoplastic components together at the weld zone using a welding subsystem having a probe; and during welding, moving the first lateral side trailing force applicator, the second lateral side trailing force applicator, and the welding subsystem probe relative to the thermoplastic components, or moving the thermoplastic components relative to the first lateral side trailing force applicator, the second lateral side trailing force applicator, and the welding subsystem probe.

* * * * *